(12) United States Patent
Zhou et al.

(10) Patent No.: US 11,656,627 B2
(45) Date of Patent: May 23, 2023

(54) OPEN SPACE PATH PLANNING USING INVERSE REINFORCEMENT LEARNING

(71) Applicant: Baidu USA LLC, Sunnyvale, CA (US)

(72) Inventors: Jinyun Zhou, Sunnyvale, CA (US); Qi Luo, Sunnyvale, CA (US); Shu Jiang, Sunnyvale, CA (US); Jiaming Tao, Sunnyvale, CA (US); Yu Wang, Sunnyvale, CA (US); Jiaxuan Xu, Sunnyvale, CA (US); Kecheng Xu, Sunnyvale, CA (US); Jinghao Miao, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 355 days.

(21) Appl. No.: 16/827,452

(22) Filed: Mar. 23, 2020

(65) Prior Publication Data

US 2021/0294340 A1  Sep. 23, 2021

(51) Int. Cl.
*G05D 1/02* (2020.01)
*G05D 1/00* (2006.01)

(52) U.S. Cl.
CPC ......... *G05D 1/0221* (2013.01); *G05D 1/0088* (2013.01); *G05D 1/0217* (2013.01); *G05D 2201/0212* (2013.01); *G05D 2201/0213* (2013.01)

(58) Field of Classification Search
CPC .. G05D 1/0221; G05D 1/0088; G05D 1/0217; G05D 2201/0212; G05D 2201/0213; G05D 1/0246; B60W 60/001; B60W 2552/50; B60W 2555/20
See application file for complete search history.

(56) References Cited

U.S. PATENT DOCUMENTS

| 2020/0023842 A1* | 1/2020 | Gutierrez | G06V 40/10 |
| 2021/0255633 A1* | 8/2021 | McKenzie | G01C 21/3407 |

* cited by examiner

*Primary Examiner* — Rodney A Butler
(74) *Attorney, Agent, or Firm* — Womble Bond Dickinson (US) LLP

(57) ABSTRACT

In one embodiment, a method determines a route from a first location of an autonomous driving vehicle (ADV) to a second location within an open space, the first location being a current location of the ADV. The method determines an objective function based on the route, the objective function having a set of costs for maneuvering the ADV from the first location to the second location. The method determines environmental conditions of the open space and uses the environmental conditions to determine a set of weights, each weight to be applied to a corresponding cost of the objective function. The method optimizes the objective function in view of one or more constraints, such that an output of the objective function reaches minimum while the one or more constraints are satisfied and generates a path trajectory with the optimized objective function to control the ADV autonomously according to the path trajectory.

20 Claims, 8 Drawing Sheets

OPEN SPACE PATH PLANNING USING INVERSE REINFORCEMENT LEARNING

TECHNICAL FIELD

Embodiments of the present disclosure relate generally to operating autonomous vehicles. More particularly, embodiments of the disclosure relate open space path planning using inverse reinforcement learning.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In addition, trajectory planning is vital for operating an autonomous driving vehicle (ADV). An open space planner may be utilized to optimize a trajectory according to various constraints. From the optimized trajectory, the ADV may generate commands to control the ADV along a path. In some instances, however, the trajectory generated by the planner often times is lacking adequate smoothness required for autonomous driving. As a result, some of the maneuvers performed by the ADV may be abrupt and less desirable by passengers.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
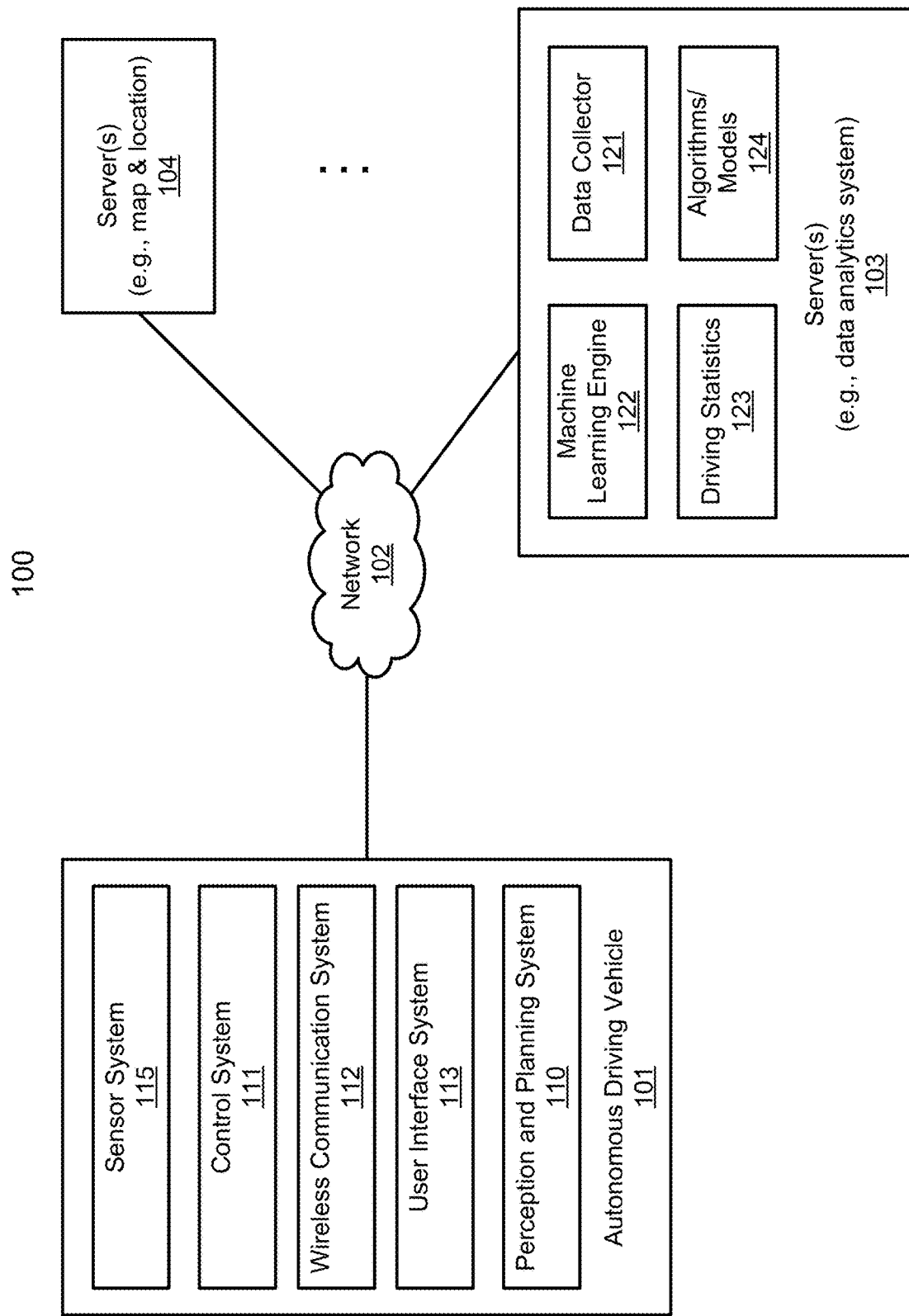
FIG. 1 is a block diagram illustrating a networked system according to one embodiment.

Several embodiments of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure solves the problem of improving the quality of path planning by adapting a path planning system based on environmental conditions in order to control the ADV to drive as if manually controlled by a human operator (e.g., while in the driver's seat). As described herein, the path planning system may produce an objective function having one or more costs (or cost functions) for controlling the ADV autonomously along a path or route. Weights may be associated and applied to each cost (e.g., multiplication) to modify the impact of each cost over the overall computed cost. In conventional planning systems, these weights are static (e.g., do not change from a pre-defined value).

The solution proposed in the current disclosure, however, provides an open space path planning method that uses a reward function to adjust (or modify) at least some of the weights based on driving conditions. Specifically, the reward function is produced through observed behavior of (expert) drivers during different driving objectives according to an Inverse Reinforcement Learning (IRL) framework. When producing the objective function, the planning system determines environmental conditions (e.g., via images captured by cameras of the ADV) and applies the conditions to the reward function to generate weights (or different weight values). As a result, the generated weights (when applied to the objective function) reflect "human-like" control with the ADV, thereby providing passengers with a more pleasurable driving experience.

According to some embodiments, a computer-implemented method performed by an ADV is disclosed. The method includes determining a route from a first location of the ADV to a second location within an open space, the first location being a current location of the ADV. The method determines an objective function based on the route, the objective function having a set of costs for maneuvering the ADV from the first location to the second location. The method determines environmental conditions (or parameters) of the open (or driving) space and uses the parameters to determine a set of weights, each weight to be applied to a corresponding cost of the objective function. The method optimizes the objective function in view of one or more constraints, such that an output of the objective function reaches minimum while the one or more constraints are satisfied. The method generates a path trajectory with the optimized objective function to control the ADV autonomously according to the path trajectory.

In one embodiment, using the environmental conditions to determine the set of weights includes performing a table lookup into a table that associates environmental conditions with weights, the predefined table is an Inverse Reinforcement Learning (IRL) model of weights that represent behaviors of expert drivers with respect to environmental conditions.

In another embodiment, determining the environmental conditions of the open space includes analyzing images captured by one or more cameras of the ADV in order to identify the environmental conditions. In one embodiment, the environmental conditions include locations of one or more objects captured within the images with respect to the current location of the ADV. In some embodiments, the environmental conditions include road features of the open space captured within the images.

In one embodiment, the method further includes controlling the ADV to maneuver from the first location to the second location along the generated path trajectory. In some embodiments, the route is a first route, the objective function is a first objective function, the open space is a first open space, and the set of costs is a first set of costs. The method further includes determining a second route from the second location of the ADV to a third location within a second open space, the second location being a current location of the ADV, determining a second objective function based on the second route, the objective function comprising a second set of costs for maneuvering from the second location to the third location, determining environmental conditions of the second open space, and using the environmental conditions of the second open space to determine a second set of weights, each weight to be applied to a corresponding cost of the second objective function. In some embodiments, at least one of the weights of the second set of weights is different than a corresponding weight of the first set of weights.

In another embodiment of the disclosure, a non-transitory machine-readable medium and a data processing system perform at least some of the processes as described herein.

FIG. 1 is a block diagram illustrating an autonomous vehicle network configuration according to one embodiment of the disclosure. Referring to FIG. 1, network configuration 100 includes autonomous driving vehicle (ADV) 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
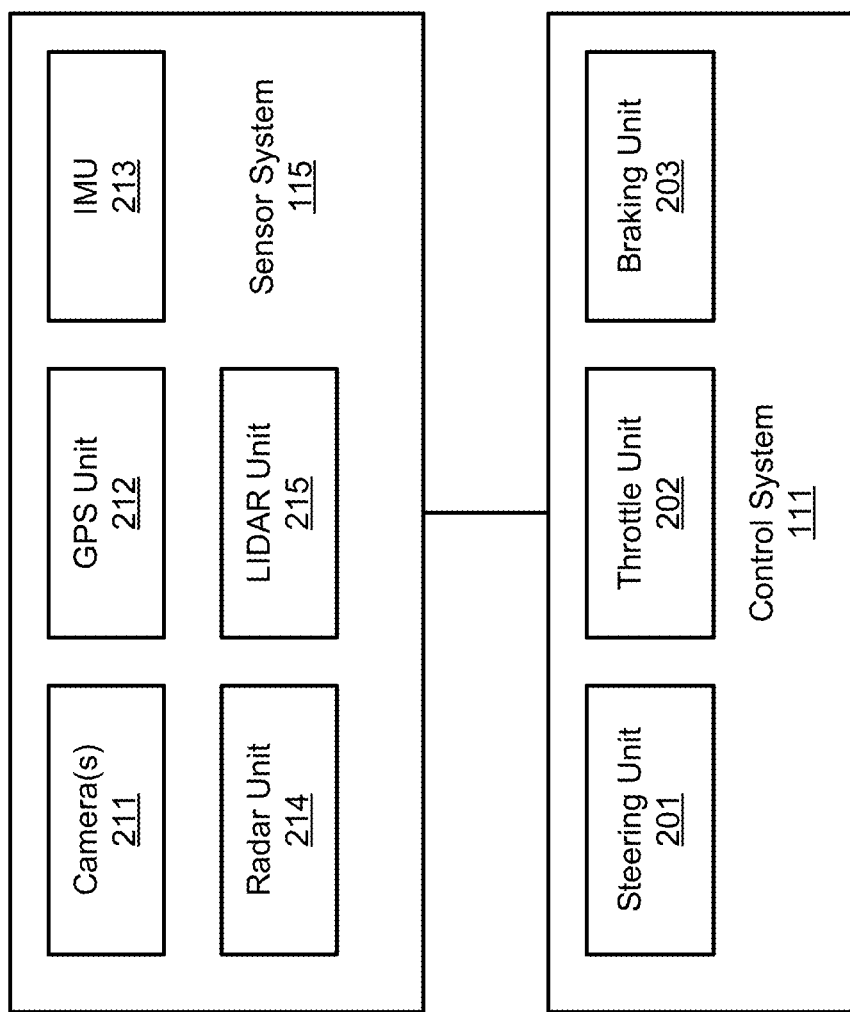
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, models 124 may include an Inverse Reinforcement Learning (IRL) model of the present disclosure. Specifically, the IRL model may be a reward function that is derived (or learned) using an IRL algorithm, where the model indicates an agent's (or an expert driver's) objectives or values based observed behavior. In particular, (e.g., in a laboratory setting) the IRL algorithm may obtain inputs, such as path trajectories (or actions) of drivers and input states (e.g., environmental conditions, such as traffic conditions), and the algorithm may output (or learn) one or more weights that represent the driver's observed behavior as the IRL model. In one embodiment, the model may be a data structure that contains a lookup table that associates the weights outputted by the IRL algorithm with one or more environmental conditions. More about the IRL model is described herein.

Figure 3A:
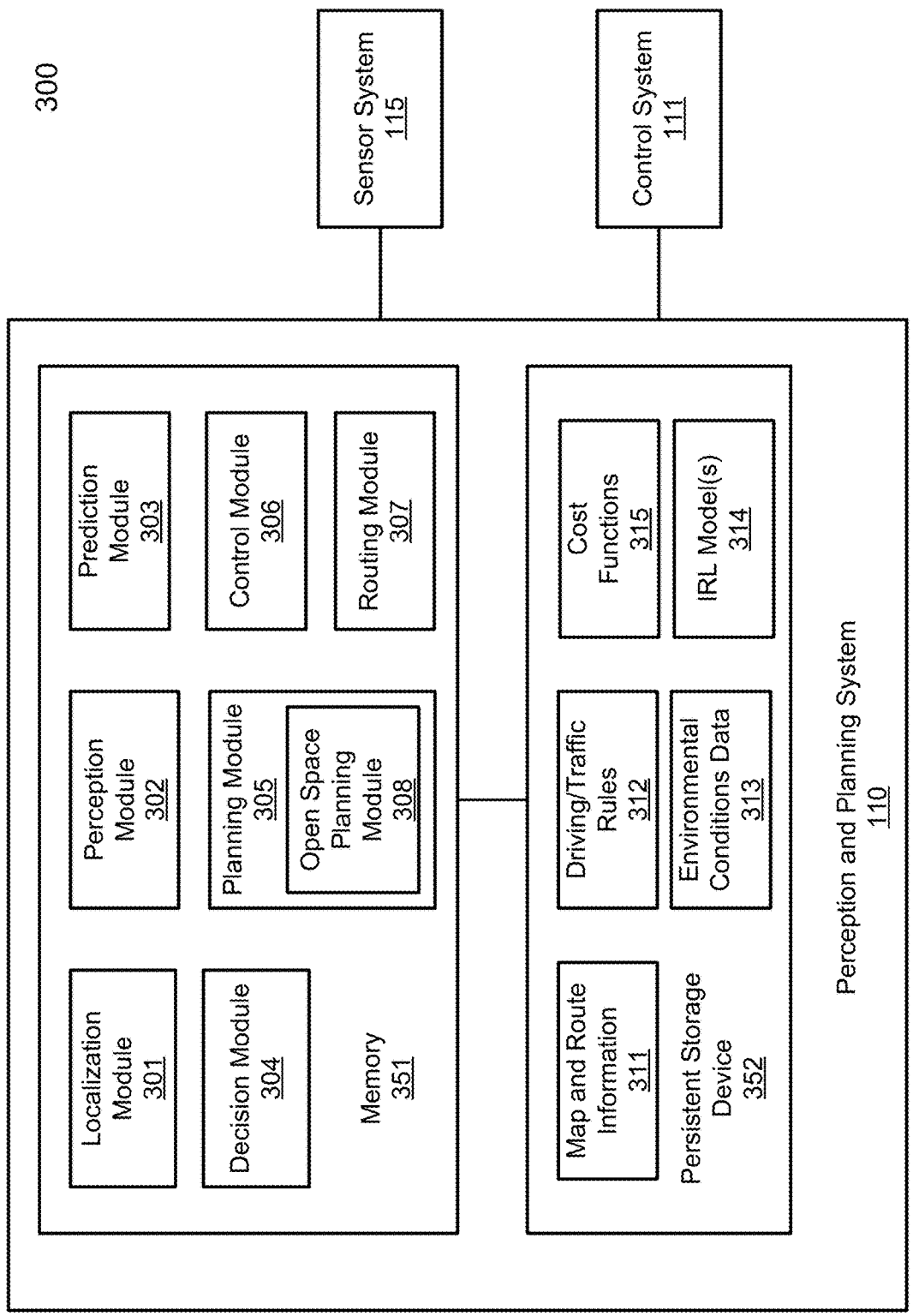
FIGS. 3A-3B are block diagrams illustrating an example of a perception and planning system used with an autonomous vehicle according to one embodiment.

In one embodiment, the algorithms and/or models (such as the IRL model) 124 can then be uploaded on ADVs to be utilized during autonomous driving in real-time (as illustrated by the IRL model(s) 314 stored in the persistent storage device 352 of FIG. 3A). In another embodiment, the models may be uploaded periodically (e.g., once a day) in order to periodically update the models as needed.

Figure 3B:
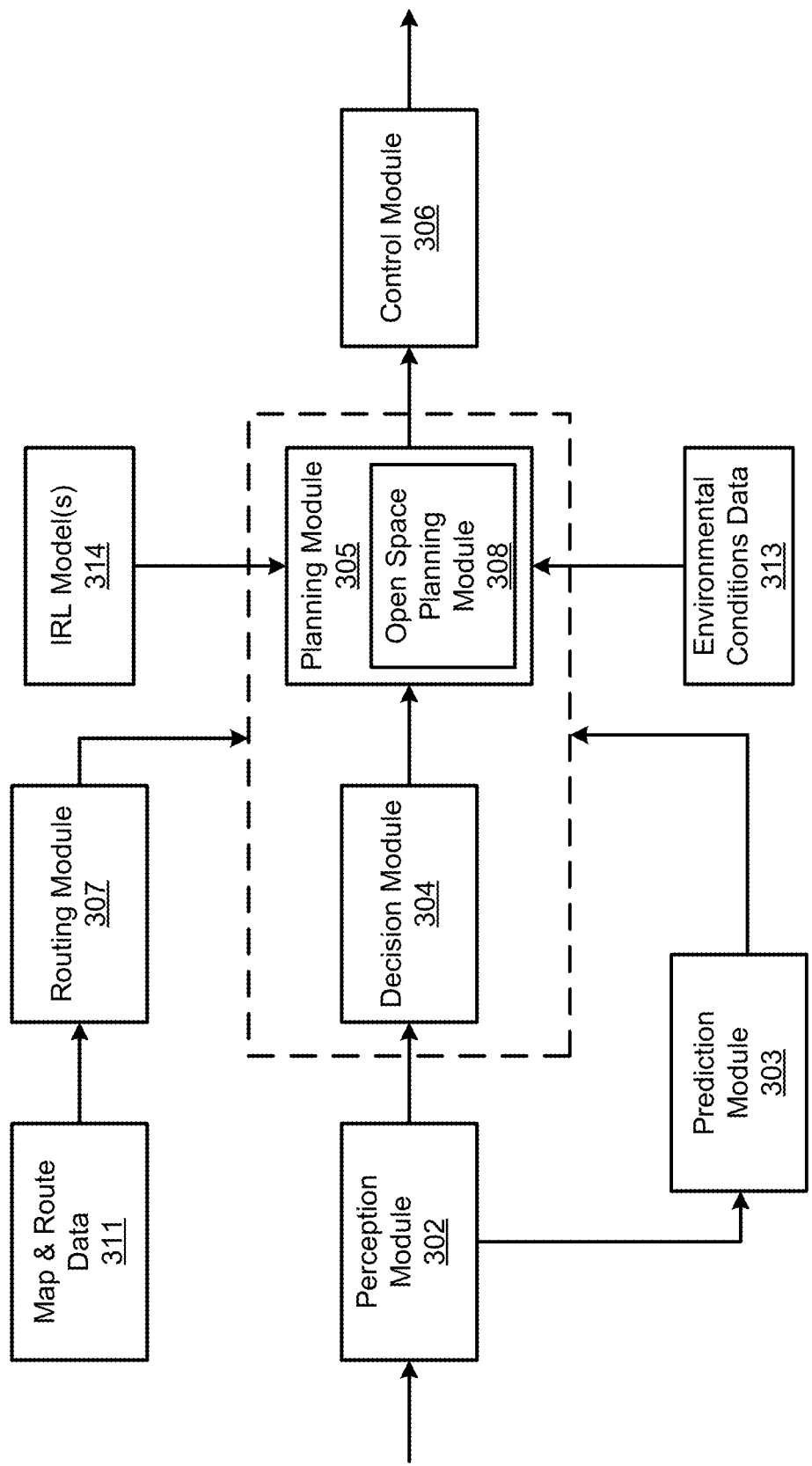

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305 that includes an open space planning module 308, control module 306, and routing module 307.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving as environmental conditions data 313. The environmental conditions data can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle as environmental conditions data 313. The objects can include traffic signals, road way boundaries, other vehicles, pedestrians, and/or obstacles, etc. In one embodiment, the data 313 may indicate spatial characteristics of the objects. For instance, the data may indicate locations of one or more objects (e.g., other vehicles) within the captured images (with respect to a current location of the ADV 101). In another embodiment, the data 313 may indicate features of the objects, such as (an estimation of) a speed and an acceleration of an identified vehicle. As another example, the features may be road features (e.g., lanes, a curvature of the road, etc.) within an open driving space in which the ADV is located. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

In one embodiment, the driving/traffic rules 312 may include traffic information, such as construction traffic signs nearby the ADV so that the ADV may avoid lanes with such construction signs. In one embodiment, the rules 312 may be a part of the environmental conditions data 313.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. More about the planning module is described herein. In one embodiment, planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, the open space planning module 308 may contain an open space planner that may be configured to generate a path trajectory for the ADV 101 in an open space, where there are no reference lines or traffic lanes to be followed. Examples of an open space include a parking lot, or a roadway where a vehicle performs a parallel parking, a U-turn, or a three-point turn. In one embodiment, the open space planner may also generate a path trajectory, where there are one or more reference lines.

In one embodiment, the planner may determine an objective function that contains one or more costs (or cost functions), e.g., contained within the cost function 315, associated with navigating the ADV along a route (as determined by the routing module 307). In one example, the objective function may be $$J = w_1 * Cost_1 + w_2 * Cost_2 + w_3 * Cost_3 + \ldots + w_n * Cost_n$$

where J is the total computed cost, $w_n$ is a weight (e.g., which may be a value, such as a value from 0 to 1) corresponding to a $Cost_n$. In one embodiment, the objective function may include one or more costs. The costs may be optimized by minimizing the objective function, J. The costs may include at least one of cross-track error (penalizing how far the ADV is from the target trajectory), heading error (penalizing an error between the ADV heading and the target trajectory direction at a point), speed cost (penalizing changes to speed), steering cost (penalizing changes in steering), acceleration cost (penalizing changes in acceleration), steering rate of change (penalizing how fast the steering changes), braking cost (penalizing braking), acceleration rate of change (penalizing how fast acceleration changes), a distance to goal position (e.g., a distance between the ADV and an identified obstacle, such as another vehicle, or a distance between the ADV and the destination), a curvature of the route (or reference line), time efficiency (e.g., how long it will take to travel from one location to a destination location) along the route, comfort of the passengers (e.g., based on sudden movements due to increasing and decreasing acceleration or braking, a minimal curvature (e.g., a distance from the route or reference line that the ADV may deviate), and a minimal curvature change rate. In one embodiment, as described herein, control commands (e.g., provided by the control module 306), such as throttle, steering, and braking) can be generated to optimally track the path trajectory, while accounting for the costs of the optimized objective function.

In one embodiment, the module 308 is configured to determine at least some weights, w, that are to be applied to corresponding costs of the objective function. Specifically, the module may obtain environmental conditions data 313 and apply the data to the IRL model to generate the weights. For example, the module may use the data 313 to perform a table lookup into the IRL model to identify and select at least some weights that are associated with the data. More about determining the weights is described herein.

In one embodiment, the open space planning module 308 uses an optimization model (e.g., Quadratic Programming (QP) optimizer) to optimize the objective function (in which one or more determined weights have been applied to one or more corresponding costs) in view of one or more constraints to generate an optimal path trajectory. Constraints can include inequality, equality, and bound constraints. In one embodiment, the constraints may include characteristics that are associated with the ADV, such as a velocity (e.g., speed) range of the ADV (e.g., how fast the ADV may travel), an acceleration range of the ADV (e.g., how quickly the ADV may accelerate and/or decelerate), a distance in front of the ADV (e.g., a distance between the ADV and an obstacle, such as another vehicle, that is in front of the ADV). In another embodiment, the constraints may relate to the open space, such as a speed limit within the open space, a distance between the ADV and road features (e.g., such as curbs), a threshold curvature of the road along which the route traverses, etc.

As described herein, the control module 306 uses the optimal path trajectory to control (or maneuver) the ADV (e.g., issue control commands) along the path trajectory. In one embodiment, the optimal path trajectory may be the same as the reference line or route determined by the routing module 307. In another embodiment, the trajectory may be (slightly) different than the determined route. In particular, the trajectory may follow a same "general" path as the route, meaning the trajectory may make at least some of the same maneuvers (e.g., turning left at 0.3 miles).

Figure 4:
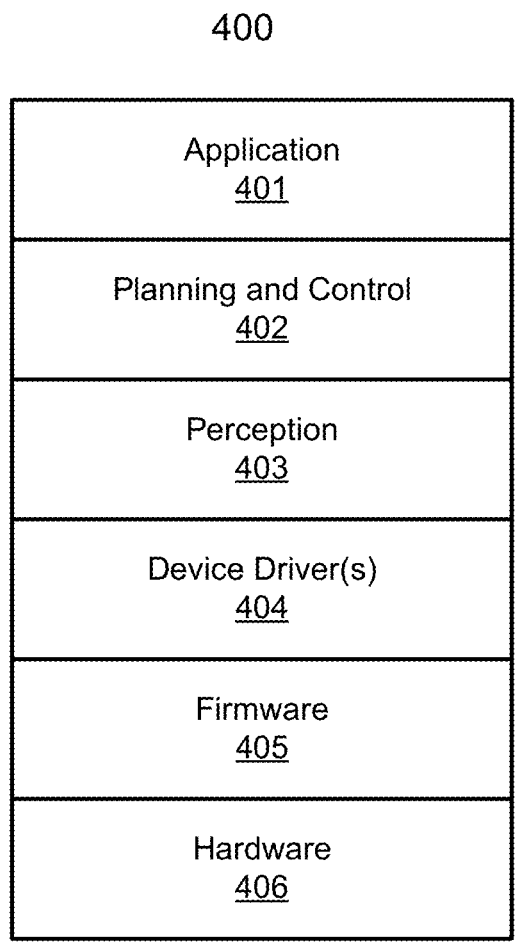
FIG. 4 shows a block diagram illustrating a system architecture for autonomous driving according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
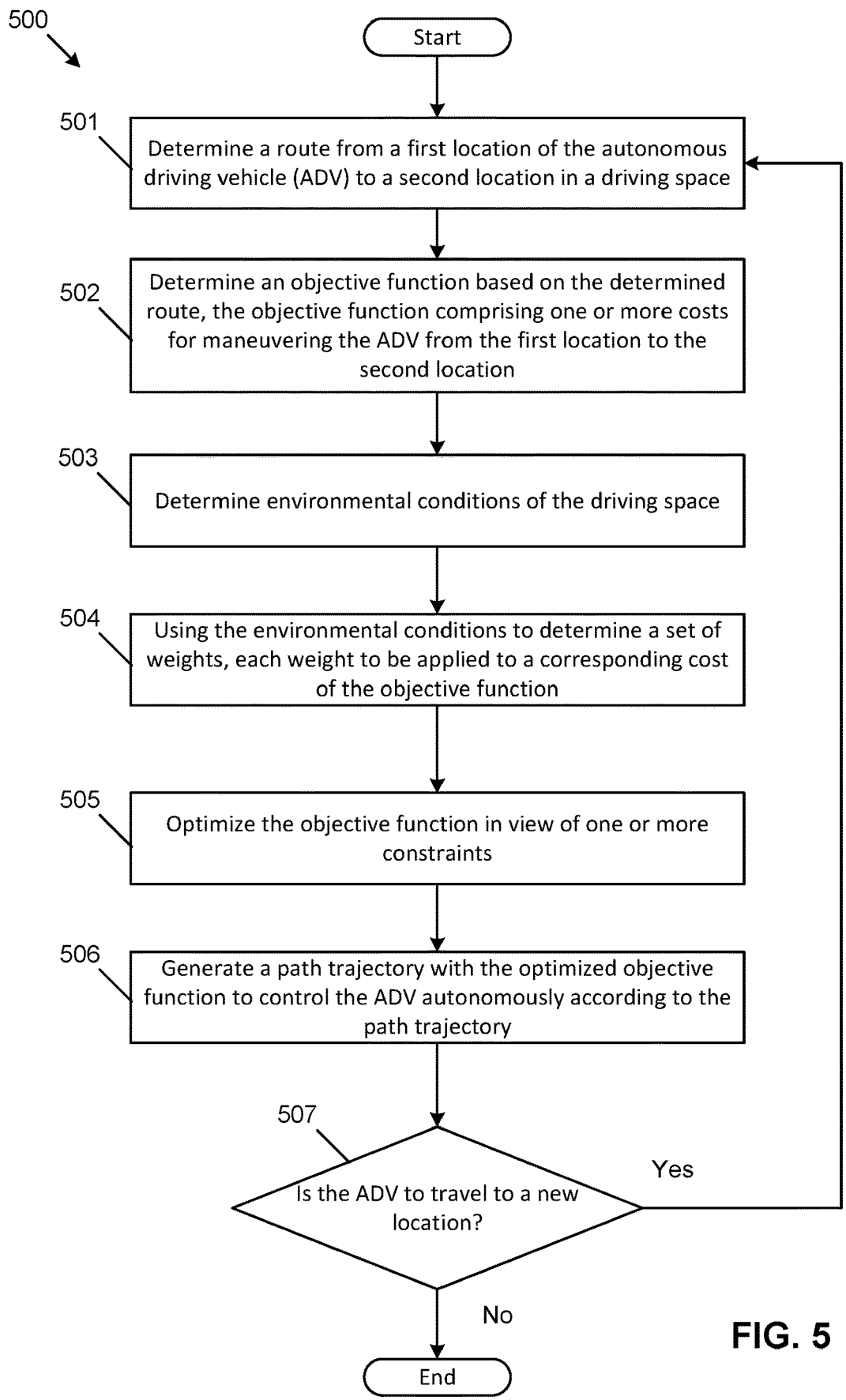
FIG. 5 is a flowchart of a process for dynamically determining one or more weights for open space path planning based on environmental conditions according to one embodiment.

FIG. 5 is a flowchart of a process for dynamically determining one or more weights for open space path planning based on environmental conditions according to one embodiment. Specifically, the process determines (or produces) one or more weight (values) to be applied to an objective function in order for an ADV to provide a "human-like" driving experience. This process may be performed by one or more processors (e.g., in the hardware 406) of the ADV (e.g., ADV 101). In one embodiment, at least some of the operations described herein may be performed by one or more of modules 301-308 of the perception and planning system 110, such as the (open space planning module 308 of the) planning module 305.

The process 500 determines a route from a first location (e.g., a current location) of the ADV to a second location within an open (driving) space (at block 501). As described herein, the routing module 307 may determine (provide) a route from a starting location to a destination. For instance, the routing module may receive route and map data based on a destination received from a user. In one embodiment, the determined route may be a route segment of several route segments that make up an entire route. In one embodiment, the routing module may generate a reference line in the form of a topographical map that includes the route, the starting location, and the destination.

The process 500 determines an objective function based on the determined route, where the objective function includes one or more costs for maneuvering the ADV from the first location to the second location, along the route (at block 502). For instance, the open path planning module 308 may determine one or more costs, from cost functions 315, associated with the route. As described herein, the costs may include a distance to goal position, a minimal curvature, and a minimal curvature change rate.

The process 500 determines environmental conditions of the open space (at block 503). As described herein, one or more cameras 211 may capture images containing objects within the camera's field of view. A computer vision system (of the perception module 302) may analyze the images to identify environmental conditions contained therein. For instance, the computer vision system may identify objects (e.g., other vehicles) within the open space. Specifically, the conditions may include positional data (locations) of the objects within the images with respect to (a current location of) the ADV. For example, the positional data may be (e.g., a two-dimensional) map of the open space surrounding the ADV (with the ADV in the middle of the map). The map may include one or more regions, each region designated a numerical value, where one value (e.g., "1") indicates an object is present within the region, while another value (e.g., "0") indicates the space is unobstructed or has no object. In another embodiment, the conditions may include characteristics of objects (e.g., a speed at which an object is moving with respect to the ADV). In some embodiments, the conditions may include road features (e.g., number of lanes, road curvature, traffic signals, etc.) contained within the captured images. In one embodiment, the environmental conditions may be determined in real-time (e.g. while the ADV is navigating within the open space).

The process 500 uses the environmental conditions to determine a set of weights, each weight to be applied to a corresponding cost of the objective function (at block 504). Specifically, the open space planning module 308 may apply the environmental conditions to one or more IRL models 314 to determine the set of weights. For instance, as described herein, the model may be a (predefined) lookup table of a reward function that associates weights that represent behaviors of expert drivers with respect to environmental conditions. In this example, the module 308 may perform a table lookup into the lookup table that associates environmental conditions with weights of one or more costs, using the determined environmental conditions to identify and select one or more weights, one for each cost of the objective function. As described herein, In one embodiment, each of the determined weights may be applied (e.g., multiplied) to a corresponding cost. For example, the determined objective function may only contain costs (e.g., without weights applied thereon). The planning module 308 may multiply each cost be a corresponding weight (or weight value). In another embodiment, the module may apply weights by updating existing weights that are applied to the costs. For instance, the determined objective function may contain weights applied thereon. In one embodiment, the weights may be predefined weights. When applying the determined weights, the module may multiple the existing weights by corresponding determined weights.

The process 500 optimizes (e.g., using a QP optimizer) the objective function in view of one or more constraints (at block 505), such that an output of the objective function reaches minimum while the one or more constraints are satisfied. For instance, the optimized objective function may be a feasible solution such that none of the constraints are violated. In one embodiment, one or more constraints may be "soft" constraints, which are allowed to be violated during the optimization process. The process 500 generates a path trajectory with the optimized objective function to control the ADV autonomously according to the path trajectory (at block 506). In one embodiment, the path trajectory may be outputted (e.g., to the control module 306) to control (or maneuver) the ADV from the current location to the desired location along the generated path trajectory. As described herein, the path trajectory may be the same or different than the determined route. For instance, the path trajectory may be "smoother" than the route. For instance, the trajectory may have less sudden movements than the determined route.

The process 500 determines whether the ADV is to travel to a new location (at decision block 507). As described herein, the route may be a route segment. Thus, the process may determine that the ADV is to navigate along another segment of a main route. In another embodiment, the routing module 307 may receive data (e.g., map data) that a user wishes to travel from the current location to a new location. If the ADV is to travel to the new location, the process 500 returns to block 501 to repeat at least some of the operations of process 500. As described herein, each time that the process is repeated one or more weights may be different (e.g., from weights that were previously determined).

Some embodiments perform variations of the process 500. For example, the specific operations of the process may not be performed in the exact order shown and described. The specific operations may not be performed in one continuous series of operations, some operations may be omitted, and different specific operations may be performed in different embodiments.

Figure 6A:
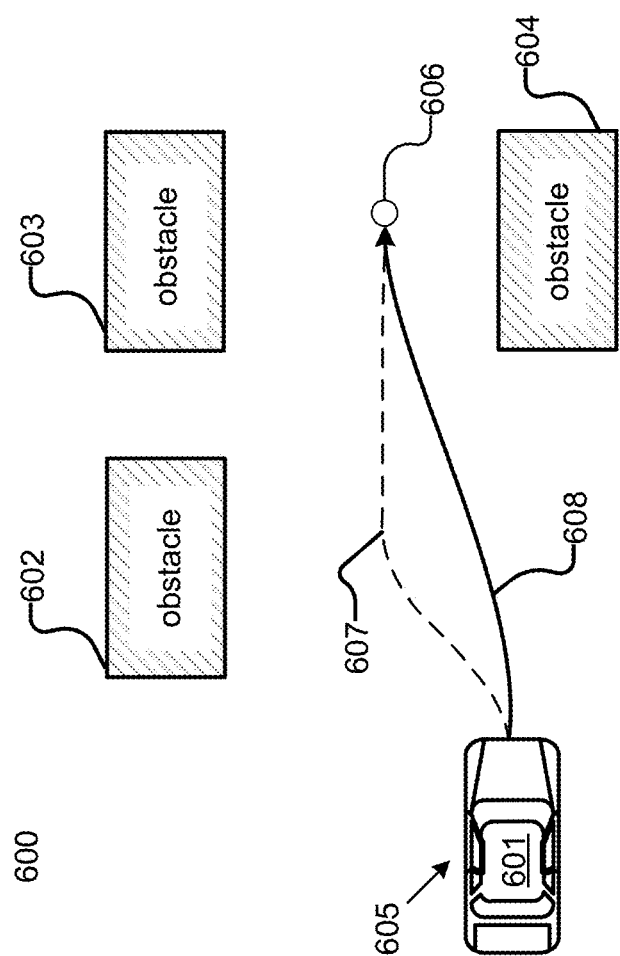
FIGS. 6A and 6B are stages that illustrate differences between static weights and weights that are dynamically determined based on environmental conditions according to another embodiment.
Figure 6B:
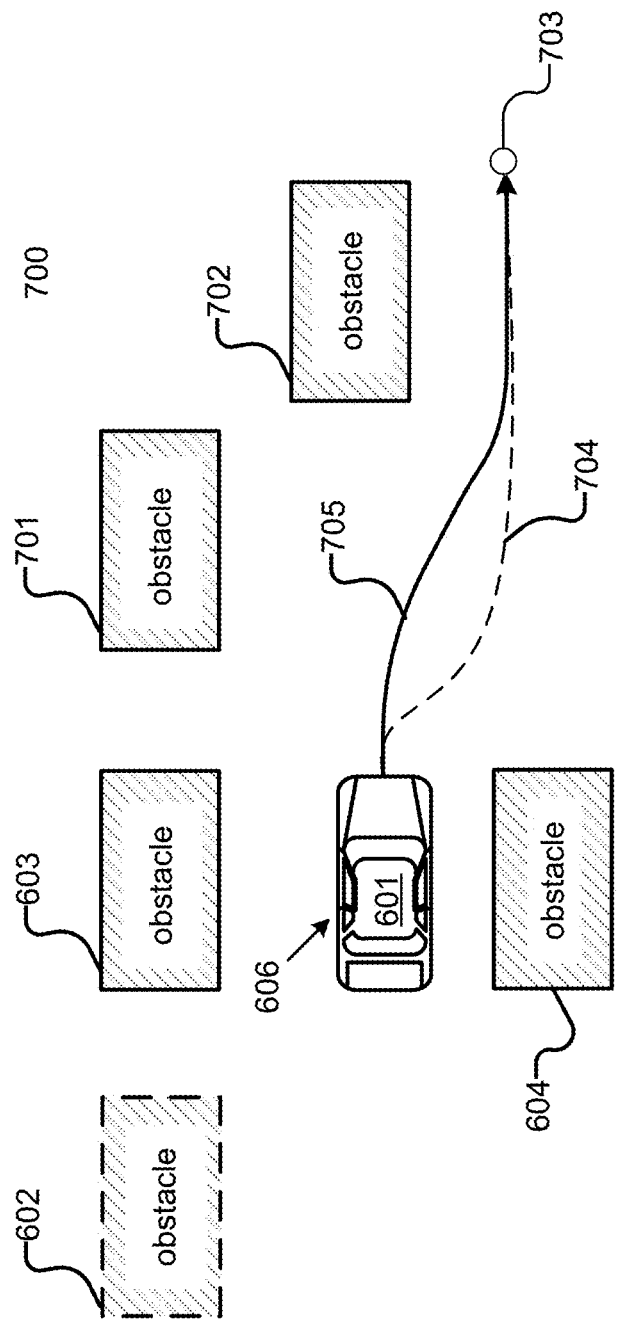

FIGS. 6A and 6B are stages that illustrate differences between static weights and weights that are dynamically determined based on environmental conditions according to another embodiment. Each figure illustrates an ADV 601 dynamically determining weights to be applied to objective functions based on changes to environmental conditions FIG. 6A shows an open (driving) space 600 that includes the ADV 601 and three obstacles 602-604. In one embodiment, ADV 601 may be similar (or the same) as ADV 101 of FIG. 1. For instance, ADV 601 may include at least some of the systems, such as the perception and planning system 110. In some embodiments, the open space 600 may be any space in which the ADV 601 may travel, such as a parking lot. As another example, the open space may be a road way (e.g., with one or more lanes). In one embodiment, the obstacles may be any object in which the ADV is to avoid contact (e.g., staying beyond a threshold distance, such as a foot) while navigating through the space. For instance, the obstacles may be other ADVs or vehicles. In another embodiment, at least some of the obstacles may be stationary obstacles (e.g., a light pole). In some embodiments, at least some of the obstacles may be associated with driving/traffic rules (contained within rules 312), such as painted lines on the roadway.

As shown, the ADV 601 is at a starting (first) location 605 within the open space 600, and the space also includes a destination location 606. Also shown are two path trajectories 607 and 608. In one embodiment, both trajectories may have been generated using the same objective function (e.g., having the same costs), but with different weights. Specifically, the objective function may include a steering cost, as described herein. The first path trajectory 607 is generated using an optimized objective function with static or predefined weights. For example, the weight applied to the cost of steering may be low (e.g., 0.2), thereby allowing the ADV to make fast steering changes). As a result, in order to avoid the obstacle 604 and to reach the destination 606, the path trajectory 607 along which the ADV will move causes the ADV to steer sharply towards obstacle 602 and then straighten out towards the destination. This trajectory, however, may not be desirable to passengers due to the sharp steering movements.

The second path trajectory 608, on the other hand, is generated using an optimized objective function with weights that are determined using the IRL model according to the environment conditions (e.g., the positions of the obstacles). In this case, the weights from the IRL model provide a more "human-like" response by increasing the weight for the steering cost (e.g., to 0.8) in order to more smoothly steer around the obstacle 604. In one embodiment, the weight may be based on the location of at least one of the obstacles within the open space 600, such as obstacle 604.

FIG. 6B illustrates that weights may be dynamically change based on changes to environmental conditions. Specifically, this figure shows a next (second) route (or route segment) in which the ADV 601 is to travel. For instance, this figure shows (a second) open space 700 that includes obstacles 701 and 702, which were not in open space 600, along with obstacles 603 and 604 that were included in open space 600. In one embodiment, obstacle 602 is not included within open space 700 (illustrated as being dashed), since the obstacle will not have any impact on the generation of the path trajectory as described herein.

In this figure, the ADV 601 is at starting location 606 (which was the destination in FIG. 6A), and the space 700 has a (new) destination location 703. Also shown are two path trajectories 705 and 704, which may have been generated using the same objective function (which may be different from the objective function used in FIG. 6A), but with different weights. In particular, path trajectory 704 may have been generated using the static weights, while trajectory 705 may have been generated using dynamically determined weights, as described herein. Again, trajectory 704 generated with the static weights makes sharp movements (e.g., having a weight 0.2 applied to the steering cost). Trajectory 705, however, has smoother turns. This trajectory is generated using an optimized (second) objective function weight a steering weight that is determined from the IRL model based on the environmental conditions. In this case, the weight may be less than the previously determined weight (e.g., 0.6), thereby less penalizing the steering cost in order to allow the ADV to make slightly sharper turns than with a higher weight.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A computer-implemented method performed by an autonomous driving vehicle (ADV), the method comprising:
    determining a route for the ADV from a first location of the ADV to a second location within an open space, the first location being a current location of the ADV;
    determining an objective function based on the route, the objective function having a set of costs for maneuvering the ADV from the first location to the second location;
    performing a table lookup into a table that associates weights with environmental conditions using one or more environmental conditions of the open space to determine a set of weights, wherein at least some of the weights represent behaviors of expert drivers with respect to at least one environmental condition, wherein each weight of the set of weights is to be applied to a corresponding cost of the objective function;
    optimizing the objective function in view of one or more constraints, such that an output of the objective function reaches minimum while the one or more constraints are satisfied; and
    generating a path trajectory with the optimized objective function to control the ADV autonomously along the path trajectory.

2. The method of claim 1, wherein the weights are of an Inverse Reinforcement Learning (IRL) model.

3. The method of claim 1, further comprising determining the environmental conditions of the open space, including analyzing images captured by one or more cameras of the ADV in order to identify the environmental conditions.

4. The method of claim 3, wherein the environmental conditions comprise locations of one or more objects captured within the images with respect to the current location of the ADV.

5. The method of claim 3, wherein the environmental conditions comprise road features of the open space captured within the images.

6. The method of claim 1 further comprising controlling the ADV to maneuver from the first location to the second location along the generated path trajectory.

7. The method of claim 6, wherein the route is a first route, the objective function is a first objective function, the open space is a first open space, and the set of costs is a first set of costs, wherein the method further comprises:
    determining a second route for the ADV from the second location of the ADV to a third location within a second open space, the second location being a current location of the ADV;
    determining a second objective function based on the second route, the objective function comprising a second set of costs for maneuvering from the second location to the third location;
    determining environmental conditions of the second open space; and
    using the environmental conditions of the second open space to determine a second set of weights, each weight to be applied to a corresponding cost of the second objective function.

8. The method of claim 7, wherein at least one of the weights of the second set of weights is different than a corresponding weight of the set of weights.

9. A non-transitory machine-readable medium having instructions stored therein, which when executed by a processor, cause the processor to perform operations, the operations comprising:
    determining a route for an autonomous driving vehicle (ADV) from a first location of the ADV to a second location within an open space, the first location being a current location of the ADV
    determining an objective function based on the route, the objective function having a set of costs for maneuvering the ADV from the first location to the second location;
    performing a table lookup into a table that associates weights with environmental conditions using one or more environmental conditions of the open space to determine a set of weights, wherein at least some of the weights represent behaviors of expert drivers with respect to at least one environmental condition, wherein each weight of the set of weights is to be applied to a corresponding cost of the objective function;
    optimizing the objective function in view of one or more constraints, such that an output of the objective function reaches minimum while the one or more constraints are satisfied; and
    generating a path trajectory with the optimized objective function to control the ADV autonomously along the path trajectory.

10. The machine-readable medium of claim 9, wherein the weights are of an Inverse Reinforcement Learning (IRL) model.

11. The machine-readable medium of claim 9, wherein the operations further comprise determining the environmental conditions of the open space, including analyzing images captured by one or more cameras of the ADV in order to identify the environmental conditions.

12. The machine-readable medium of claim 9, wherein the operations further comprise controlling the ADV to maneuver from the first location to the second location along the generated path trajectory.

13. The machine-readable medium of claim 12, wherein the route is a first route, the objective function is a first objective function, the open space is a first open space, and the set of costs is a first set of costs, wherein the operations further comprise:
 determining a second route for the ADV from the second location of the ADV to a third location within a second open space, the second location being a current location of the ADV;
 determining a second objective function based on the second route, the objective function comprising a second set of costs for maneuvering from the second location to the third location;
 determining environmental conditions of the second open space; and
 using the environmental conditions of the second open space to determine a second set of weights, each weight to be applied to a corresponding cost of the second objective function.

14. The machine-readable medium of claim 13, wherein at least one of the weights of the second set of weights is different than a corresponding weight of the set of weights.

15. A data processing system, comprising:
 a processor; and
 a memory coupled to the processor to store instructions, which when executed by the processor, cause the processor to perform operations, the operations including
  determining a route for an autonomous driving vehicle (ADV) from a first location of the ADV to a second location within an open space, the first location being a current location of the ADV;
  determining an objective function based on the route, the objective function having a set of costs for maneuvering the ADV from the first location to the second location;
  performing a table lookup into a table that associates weights with environmental conditions using on one or more environmental conditions of the open space to determine a set of weights, wherein at least some of the weights represent behaviors of expert drivers with respect to at least one environmental condition, wherein each weight of the set of weights is to be applied to a corresponding cost of the objective function;
  optimizing the objective function in view of one or more constraints, such that an output of the objective function reaches minimum while the one or more constraints are satisfied; and
  generating a path trajectory with the optimized objective function to control the ADV autonomously along the path trajectory.

16. The data processing system of claim 15, wherein the weights are of Inverse Reinforcement Learning (IRL) model.

17. The data processing system of claim 15, wherein the operations further comprise determining the environmental conditions of the open space, including analyzing images captured by one or more cameras of the ADV in order to identify the environmental conditions.

18. The data processing system of claim 15, wherein the operations further comprise controlling the ADV to maneuver from the first location to the second location along the generated path trajectory.

19. The data processing system of claim 18, wherein the route is a first route, the objective function is a first objective function, the open space is a first open space, and the set of costs is a first set of costs, wherein the instructions further comprise:
 determining a second route for the ADV from the second location of the ADV to a third location within a second open space, the second location being a current location of the ADV;
 determining a second objective function based on the second route, the objective function comprising a second set of costs for maneuvering from the second location to the third location;
 determining environmental conditions of the second open space; and
 using the environmental conditions of the second open space to determine a second set of weights, each weight to be applied to a corresponding cost of the second objective function.

20. The data processing system of claim 19, wherein at least one of the weights of the second set of weights is different than a corresponding weight of the set of weights.

* * * * *